United States Patent
Redelsheimer et al.

(10) Patent No.: US 9,501,172 B2
(45) Date of Patent: *Nov. 22, 2016

(54) DUAL STIFFNESS SUSPENSION SYSTEM

(71) Applicant: Immersion Corporation, San Jose, CA (US)

(72) Inventors: Elena Redelsheimer, Milpitas, CA (US); Daniel Parker, San Jose, CA (US); Trevor Jones, Los Gatos, CA (US); Kohei Imoto, Cupertino, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/968,102

(22) Filed: Dec. 14, 2015

(65) Prior Publication Data

US 2016/0098145 A1    Apr. 7, 2016

Related U.S. Application Data

(63) Continuation of application No. 14/089,363, filed on Nov. 25, 2013, now Pat. No. 9,213,409.

(51) Int. Cl.
*G06F 3/041* (2006.01)
*G06F 3/01* (2006.01)
*G06F 1/16* (2006.01)

(52) U.S. Cl.
CPC ........... *G06F 3/0416* (2013.01); *G06F 1/1643* (2013.01); *G06F 3/016* (2013.01); *G06F 3/041* (2013.01); *G06F 3/0414* (2013.01)

(58) Field of Classification Search
CPC .. G06F 3/04812; G06F 3/016; B60W 50/16; H01H 13/85
USPC ................... 345/173; 340/4.12, 407.1, 407.2
See application file for complete search history.

(56) References Cited

U.S. PATENT DOCUMENTS

| | | |
|---|---|---|
| 3,128,999 A | 4/1964 | Schmitt |
| 4,556,130 A | 12/1985 | Puszakowski |

(Continued)

FOREIGN PATENT DOCUMENTS

| | | |
|---|---|---|
| CN | 102221889 | 10/2011 |
| CN | 202094851 | 12/2011 |

(Continued)

OTHER PUBLICATIONS

Extended European Search Report, EP Appl No. 14 194 311.8, Apr. 22, 2015.

*Primary Examiner* — Stephen Sherman
(74) *Attorney, Agent, or Firm* — Medler Ferro Woodhouse & Mills

(57) ABSTRACT

Devices disclosed herein include a housing component, a touch screen, a haptic actuator for moving the touch screen relative to the housing component, and at least one dual stiffness suspension system that couples the touch screen and housing component together such that the touch screen is movable relative to the housing component. The dual stiffness suspension system has a first element of a first stiffness and a second element of a second stiffness which is stiffer than the first stiffness. The dual stiffness suspension system is configured to limit movement between the touch screen and the housing component in a first direction due to the first element of the dual stiffness suspension system while also being configured to allow movement of the touch screen relative to the housing component in a second opposing direction due to the second element of the dual stiffness suspension system.

20 Claims, 9 Drawing Sheets

(56) References Cited

U.S. PATENT DOCUMENTS

| | | |
|---|---|---|
| 5,335,893 A | 8/1994 | Opp |
| 5,419,626 A | 5/1995 | Crockett |
| 5,568,357 A | 10/1996 | Kochis et al. |
| 5,594,574 A | 1/1997 | Lara et al. |
| 5,751,551 A | 5/1998 | Hileman et al. |
| 5,765,819 A | 6/1998 | Hummel |
| 5,965,249 A | 10/1999 | Sutton et al. |
| 6,744,903 B1 | 6/2004 | Jeon |
| 6,822,635 B2 | 11/2004 | Shahoian et al. |
| 6,879,318 B1 | 4/2005 | Chan et al. |
| 6,882,528 B2 | 4/2005 | Chuang |
| 6,975,305 B2 | 12/2005 | Yamashita |
| 7,267,313 B2 | 9/2007 | Krzoska et al. |
| 7,616,436 B2 | 11/2009 | DeMoss et al. |
| 7,633,745 B2 | 12/2009 | Sakakibara et al. |
| 7,835,147 B2 | 11/2010 | Merz et al. |
| 7,839,639 B2 | 11/2010 | Najbert |
| 8,061,673 B2 | 11/2011 | Yao |
| 8,068,337 B2 | 11/2011 | Yao et al. |
| 8,362,882 B2 | 1/2013 | Heubel et al. |
| 2002/0180712 A1 | 12/2002 | Sato et al. |
| 2003/0206202 A1 | 11/2003 | Moriya |
| 2004/0160422 A1 | 8/2004 | Choi et al. |
| 2006/0022952 A1 | 2/2006 | Ryynanen |
| 2006/0023416 A1 | 2/2006 | Chen |
| 2006/0109254 A1 | 5/2006 | Akieda et al. |
| 2006/0181517 A1 | 8/2006 | Zadesky et al. |
| 2007/0298877 A1 | 12/2007 | Rosenberg |
| 2008/0055277 A1 | 3/2008 | Takenaka et al. |
| 2008/0060856 A1 | 3/2008 | Shahoian et al. |
| 2008/0111788 A1 | 5/2008 | Rosenberg et al. |
| 2009/0015549 A1 | 1/2009 | Gelfond et al. |
| 2010/0045612 A1 | 2/2010 | Molne |
| 2010/0117809 A1 | 5/2010 | Dai et al. |
| 2010/0127140 A1 | 5/2010 | Smith |
| 2010/0172080 A1 | 7/2010 | Bestle |
| 2010/0245254 A1 | 9/2010 | Olien et al. |
| 2011/0032091 A1 | 2/2011 | Park et al. |
| 2011/0043454 A1 | 2/2011 | Modarres et al. |
| 2011/0053653 A1 | 3/2011 | Tho et al. |
| 2011/0080350 A1 | 4/2011 | Almalki et al. |
| 2011/0164365 A1 | 7/2011 | McClure et al. |
| 2011/0227849 A1 | 9/2011 | Olien et al. |
| 2011/0291996 A1 | 12/2011 | Gao et al. |
| 2012/0206248 A1 | 8/2012 | Biggs |
| 2012/0319827 A1 | 12/2012 | Pance et al. |
| 2013/0044049 A1 | 2/2013 | Biggs et al. |
| 2013/0100607 A1 | 4/2013 | Ternus et al. |
| 2014/0028573 A1 | 1/2014 | Olien et al. |
| 2014/0125471 A1 | 5/2014 | Organ et al. |

FOREIGN PATENT DOCUMENTS

| | | |
|---|---|---|
| DE | 200 19 074 U1 | 2/2001 |
| EP | 1 691 263 | 8/2006 |
| JP | 2006/048453 | 2/2006 |
| JP | 2012108402 | 6/2012 |
| WO | 2004/081776 | 9/2004 |
| WO | 2010/116962 | 10/2010 |
| WO | 2012/002664 | 1/2012 |
| WO | 2012/067370 | 5/2012 |
| WO | 2014/134962 | 9/2014 | ated Mar. 16, 2011, herein
DUAL STIFFNESS SUSPENSION SYSTEM

CROSS-REFERENCE TO RELATED APPLICATIONS

This application is a continuation of U.S. patent application Ser. No. 14/089,363, filed Nov. 25, 2013, now U.S. Pat. No. 9,213,409, which is hereby incorporated by reference in its entirety for all purposes.

FIELD OF THE INVENTION

The present invention relates generally to components and/or systems which provide haptic feedback to the user, more particularly to touch screens and touch surfaces which provide haptic feedback to the user.

BACKGROUND OF THE INVENTION

New generation consumer devices increasingly rely on touch screen inputs such as virtual buttons and sliders displayed on a screen as an alternative to physical inputs. Users may interface with such devices almost exclusively by touching and/or otherwise manipulating the virtual buttons, sliders, scrollers, and the like on the screen with one or more finger(s). Graphic displays on the screen provide visual feedback responsive to such manipulation. In some more recent touch screen devices, force feedback or tactile feedback, commonly collectively known as haptic feedback, can also be provided to a user as the user's fingers interact with virtual objects on the touch screen. This is accomplished generally by moving or vibrating the screen with a haptic actuator coupled to the screen.

To allow the haptic touch screen to move in response to the haptic actuator and thereby to isolate a haptic effect to the screen, haptic touch screens have been compliantly suspended within electronic devices in which they reside. It is important, however, that, even though the screen must be able to move when the haptic actuator is activated, the suspended screen must nevertheless feel to a user as if it were substantially rigidly mounted when touched. Others have addressed the problem by not using a suspension, but not using a suspension limits the mass of the system that can have haptic effects.

Suspensions utilizing compliant grommet for mounting touch screens and touch surfaces within a housing are known, as illustrated in U.S. patent application Ser. No. 13/049,265 to Olien et al., filed Mar. 16, 2011, herein incorporated by reference in its entirety. More particularly, FIG. 1 reproduced from Olien et al. illustrates an exploded view of various components of an electronic touch screen system 100 for providing haptic feedback to a touch screen 102 that utilizes a plurality of grommet suspension elements 104 in a compliant suspension system. In addition to touch screen 102, touch screen system 100 includes a carrier 106, a motor or haptic actuator 108, a dust seal 110, an LCD component 112, and a main housing component 114. Grommet suspension elements 104 are configured to allow preferential movement of touch screen 102 along a certain axis, such as along an x-axis, while limiting movement in other directions, such as along a y-axis or a z-axis.

In addition to compliant grommet components, other suspensions have been proposed for touch screen applications as illustrated in U.S. Pat. No. 8,059,105 to Rosenberg et al., herein incorporated by reference in its entirety, and U.S. Pat. Appl. Pub. No. 2010/0245254 A1 to Olien et al, herein incorporated by reference in its entirety. FIG. 2, which is reproduced from Rosenberg et al., illustrates a touch screen system 200 having one or more spring elements 204 coupled between a touchpad or touch screen 202 and a main housing component 214. Spring elements 204 are shown as helical or coiled elements, but may be a compliant material such as rubber, foam, or flexures. Spring elements 204 couple touch screen 202 to the rigid housing 214 of system 200 and allow touch screen 202 to be moved along the z-axis. In the embodiment of FIG. 2, one or more piezoelectric actuators 208 are coupled to the underside of a touch screen 202 and serve to output a small pulse, vibration, or texture sensation onto touch screen 202 and to the user if the user is contacting the touch screen.

A need exists in the art for improved and/or alternative compliant suspension systems for haptic touch screens.

SUMMARY OF THE INVENTION

Embodiments hereof are directed to a device having a dual stiffness suspension system. The device includes a housing component, a touch screen, a haptic actuator for moving the touch screen relative to the housing component and thereby provide a haptic effect to a user of the touch screen, and at least one dual stiffness suspension system that couples the touch screen and housing component together such that the touch screen is movable relative to the housing component. The at least one dual stiffness suspension system has a first element of a first stiffness and a second element of a second stiffness, the first stiffness being stiffer than the second stiffness. The at least one dual stiffness suspension system is configured to limit movement between the touch screen and the housing component in at least a first direction due to the first element of the dual stiffness suspension system while also being configured to allow movement of the touch screen relative to the housing component in a second direction opposing the first direction due to the second element of the dual stiffness suspension system.

In another embodiment hereof, the device includes a housing component, a touch screen, a haptic actuator for moving the touch screen relative to the housing component and thereby provide a haptic effect to a user of the touch screen, and at least one dual stiffness suspension system that couples the touch screen and housing component together such that the touch screen is movable relative to the housing component. The at least one dual stiffness suspension system has a first element formed from a first elastomeric material having a first stiffness and a second element formed from a second elastomeric material having a second stiffness, the first stiffness being stiffer than the second stiffness. The first element of the dual stiffness suspension system is configured to limit movement between the touch screen and the housing component in at least a first direction while the second element of the dual stiffness suspension system is configured to allow movement of the touch screen relative to the housing component in a second direction opposing the first direction.

In another embodiment hereof, the device includes a housing component, a touch screen, a haptic actuator for moving the touch screen relative to the housing component and thereby provide a haptic effect along a first axis of the device to a user of the touch screen, and at least one dual stiffness suspension system that couples the touch screen and housing component together such that the touch screen is movable relative to the housing component. The at least one dual stiffness suspension system has a first element of a first stiffness and a second element of a second stiffness, the first stiffness being stiffer than the second stiffness. The at least one dual stiffness suspension system is configured to limit movement between the touch screen and the housing component in at least a first direction due to the first element of the dual stiffness suspension system while also being configured to allow movement of the touch screen relative to the housing component in a second direction due to the second element of the dual stiffness suspension system. The first direction and the second direction oppose each other and extend along the first axis of the device.

BRIEF DESCRIPTION OF DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Specific embodiments of the present invention are now described with reference to the figures, wherein like reference numbers indicate identical or functionally similar elements. The following detailed description is merely exemplary in nature and is not intended to limit the invention or the application and uses of the invention. Although descriptions of embodiments hereof are in the context of a suspension system for an electronic touch screen, the invention may also be used in any other applications where it is deemed useful. Furthermore, there is no intention to be bound by any expressed or implied theory presented in the preceding technical field, background, brief summary or the following detailed description.

Embodiments hereof are directed to a dual stiffness suspension system for mounting touch screens and touch surfaces within a housing. The dual stiffness suspension system will be described below within the context of a touch screen wherein a graphical display is disposed behind a touch surface or touch element. It will be understood, however, that the invention is not limited to suspensions for such touch screens but is equally applicable to any haptically excited touch surface or touch element. For example, the suspension system might be applied to suspend the touch pad of a computer wherein the display screen is not co-located with the touch pad. It may be applied to suspend a touch element with at least one touch sensitive region or an array of touch sensitive regions that may be created by capacitive sensors, near field effect sensors, piezo sensors, or other sensor technology. The graphical element may be a display located behind or in a separate location from the touch element and updated by a host computer, or it may simply be a plastic surface with features (e.g. graphics) indicating touch sensitive regions of an associated touch element. Thus, the term touch screen when used in the following detailed description and in the claims should be construed to encompass traditional touch screens as well as any touch surface or touch element and associated graphical element to which haptic effects may be applied.

Figure 1:
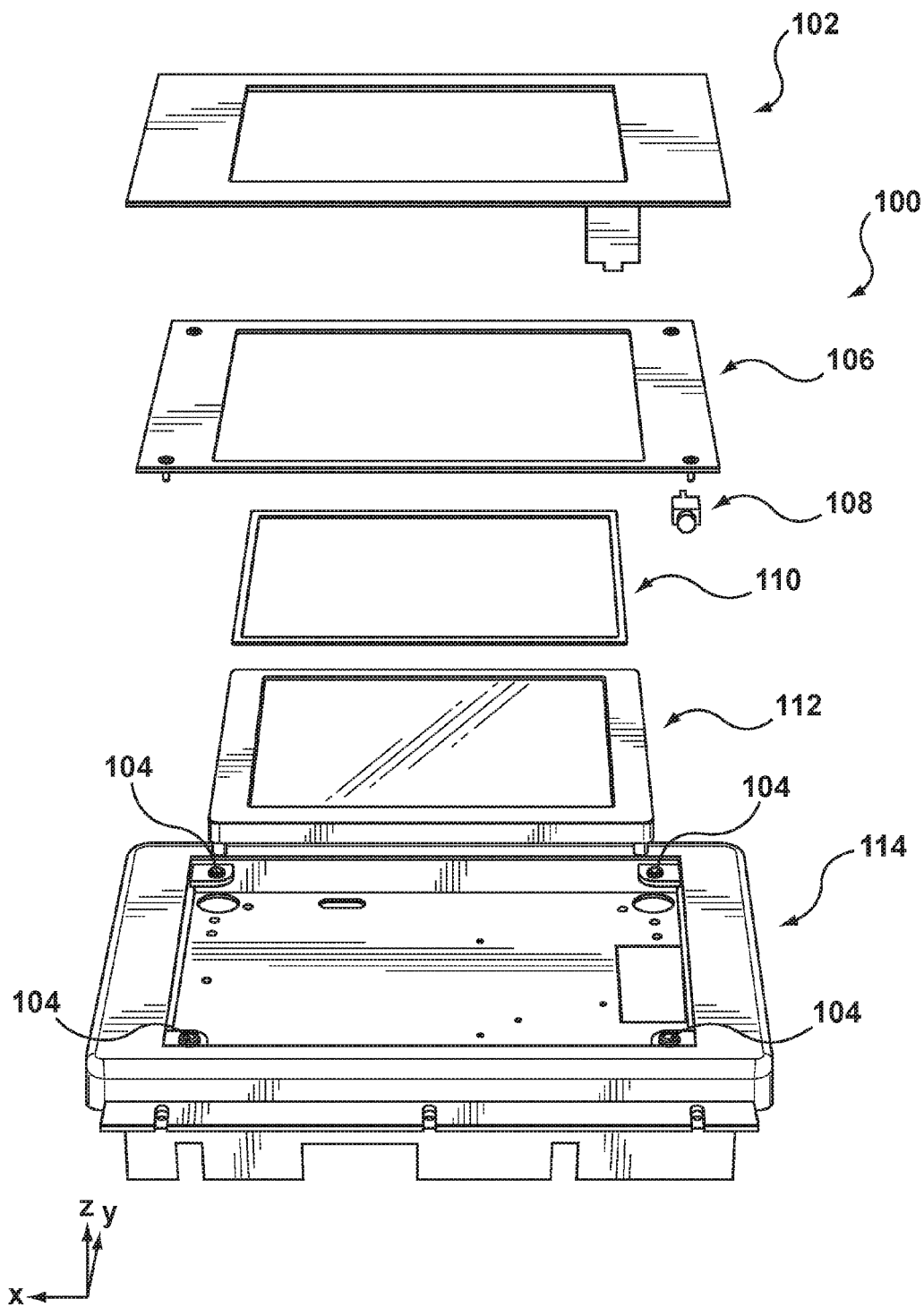
FIG. 1 is an exploded perspective view illustrating various components of a prior art haptic device for providing haptic feedback, wherein grommets are utilized for suspension.
Figure 2:
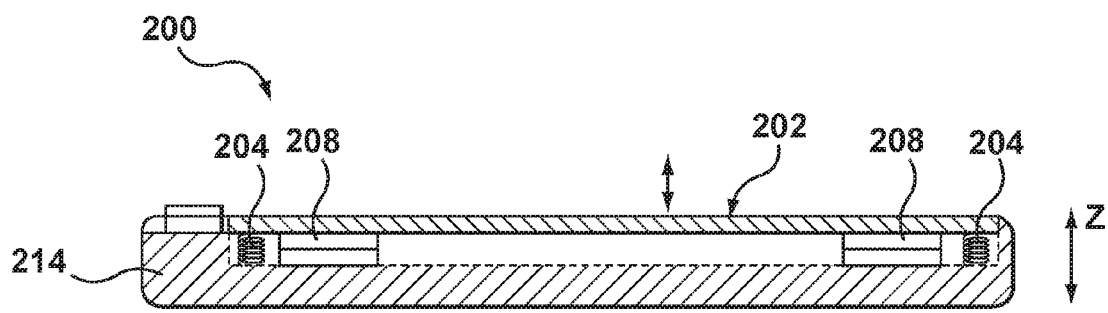
FIG. 2 is a side view of a prior art haptic device for providing haptic feedback, wherein springs are utilized for suspension.
Figure 3:
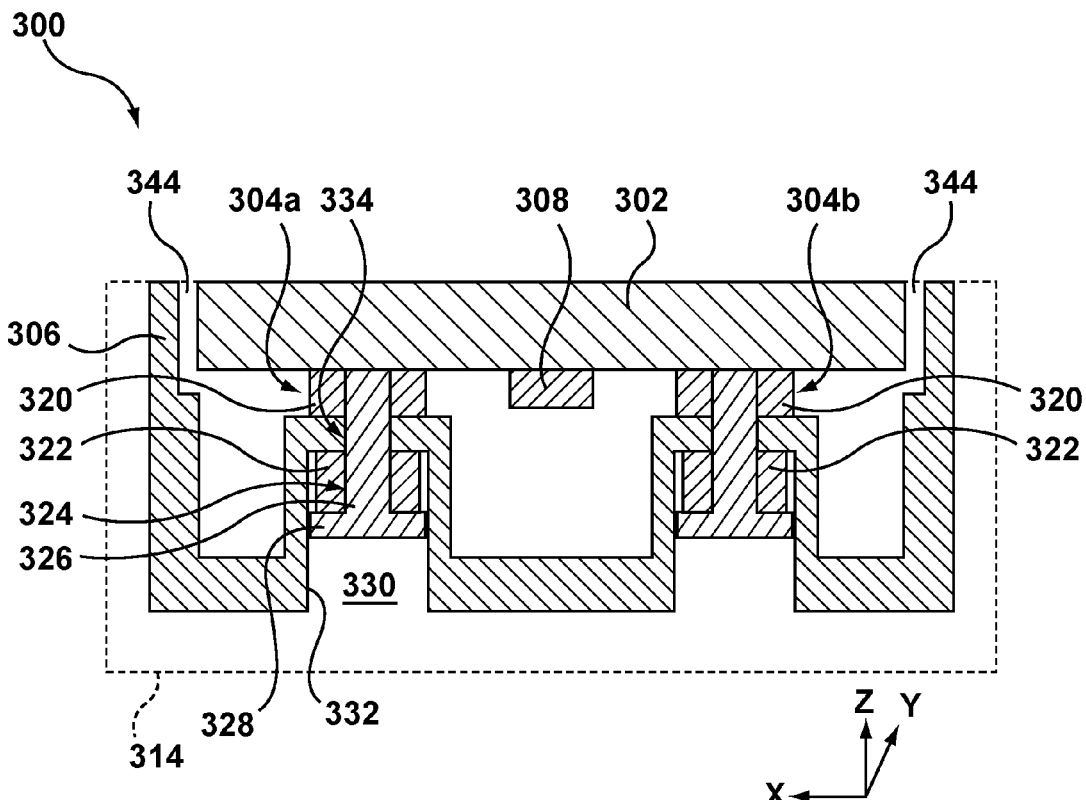
FIG. 3 is a side sectional view of a haptic device for providing haptic feedback according to an embodiment hereof, wherein a dual stiffness suspension system is utilized for suspension and the dual stiffness suspension system includes a first elastomeric element or component and a second elastomeric element or component.

Embodiments hereof are directed to a haptic device having a dual stiffness suspension system. More particularly, FIG. 3 illustrates a haptic device 300 that includes a touch surface or screen 302, a carrier or housing component 306, a haptic actuator 308 for providing a haptic effect to a user of the touch screen, and dual stiffness suspension systems 304A, 304B that couple touch screen 302 and housing component 306 together such that the touch screen is movable relative to the housing component. Carrier or housing component 306 may be formed from a sheet metal such as steel or aluminum, or a plastic material such as polycarbonate or PC-ABS. Carrier or housing component 306 is rigidly or fixedly coupled to a main housing 314, shown in phantom in FIG. 3, by any suitable means known in the art including but not limited to threaded fasteners, snap fit fasteners, press fit fasteners, and adhesive. Main housing 314 is generally considered to be a compartment or casing, but may be any type of base component. In an embodiment, haptic device 300 may be a medical device with a seven inch touch screen display, for instance. Haptic device 300 may be any of a number of devices having an automotive interface (i.e., touch screen, touch pad, or touch panel) such as, for instance, a computer, cellular telephone, PDA, portable gaming device, media player, a printer, an office telephone, or the like. Haptic actuator 308 is coupled to an underside surface of touch screen 302 and may be any of a number of known actuator types including, without limitation, a piezo actuator, voice coil actuator, an eccentric mass actuator, an E-core type actuator, a solenoid, a moving magnet actuator, or other type of actuator as desired. It will be understood by one of ordinary skill in the art that the placement of haptic actuator 308 may vary from that shown and is not limited to the location shown in FIG. 3. Software is used to provide haptic feedback to the user of haptic device 300. In an embodiment, touch screen 302 can display a graphical environment based on application programs and/or operating systems that are running, such as a graphical user interface (GUI). The graphical environment may include, for example, backgrounds, windows, data listings, a cursor, icons such as buttons, and other graphical objects well known in GUI environments. A user interacts with haptic device 300 by touching various regions of touch screen 302 to activate, move, flip, advance, or otherwise manipulate the virtual graphical objects displayed on the screen, and thereby to provide inputs to the device. Such touch screens and GUIs are well known, as exemplified in U.S. Pat. No. 8,059,105 to Rosenberg et al. incorporated by reference above. Although not shown, haptic device 300 may also include an LCD component (not shown) fixed to main housing component 314 in any suitable manner with a dust seal (not shown) installed to prevent dust intrusion between touch screen 302 and the LCD component.

In the embodiment of FIG. 3, two discrete but identical dual stiffness suspension systems 304A, 304B couple touch screen 302 and housing component 306 but it will be understood by those of ordinary skill in the art that more dual stiffness suspension systems may be utilized, or only one dual stiffness suspension system may be utilized. For example, in another embodiment hereof (not shown), the haptic device may include a plurality of discrete dual stiffness suspension systems extending between touch screen 302 and housing component 306 at strategic locations such as but not limited to the corners of the haptic device and/or along one or more edges of the haptic device. In yet another embodiment hereof (not shown), only one dual stiffness suspension system may extend continuously under all or a portion of touch screen.

Touch screen 302 of haptic device 300 may be considered a haptic touch screen in that it is provided with haptic actuator 308 and associated control hardware and software that provide signals to the actuator causing it to induce desired motion of touch screen 302 in coordination with the user's touches. A signal may be provided to, for example, induce a jolt in conjunction with a virtual button press or collisions between virtual elements, or vibrations in conjunction with movement of virtual elements across the screen, or other types of screen movements as described in more detail in U.S. Pat. No. 8,059,105 to Rosenberg et al. incorporated by reference above. Such haptic feedback or effects, also known as tactile feedback, touch feedback, and vibro-tactile feedback, allows for a more intuitive, engaging, and natural experience for the user of haptic device 300 and thus interaction between the user and haptic device 300 is considerably enhanced through the tactile feedback provided by the haptic effects.

In this embodiment, the forces produced or output by actuator 308 onto touch screen 302 are linear and along the z-axis, which is perpendicular or normal to the planar surface of the touch screen 302. In order to allow a user to feel the forces produced or output by actuator 308, dual stiffness suspension systems in accordance with embodiments hereof are installed to allow touch screen 302 to have the required compliance for haptic feedback and be moved by the forces output by actuator 308. However, when the user applies forces to touch screen 302 during operation thereof, allowing movement or travel of the touch screen along the z-axis may feel fragile or instable to the user. Stated another way, although it is desirable to allow movement of the touch screen along the z-axis during haptic feedback, it is not desirable to allow movement of the touch screen along the z-axis during user operation or control thereof. Accordingly, dual stiffness suspension systems in accordance with embodiments hereof are configured or formed to have different stiffness properties in different directions. By including two elements or components of differing stiffnesses, the performance of the suspension system can be designed or configured to match the system in which it is installed. For example, the stiffness of the suspension system is varied in different directions, i.e., greater in one direction and less in another direction, to allow a touch screen to move in the direction of the desired haptic effect but be very rigid in other directions. Thus, dual stiffness suspension systems in accordance with embodiments hereof are configured to allow preferential movement of touch screen 302 with respect to housing component 306 in a first direction while limiting movement in at least a second opposing direction. "Opposing directions" as used herein includes a pair of directions that extend or face away from each other, or extend or face in opposite ways that are 180 degrees from each other.

Figure 3A:
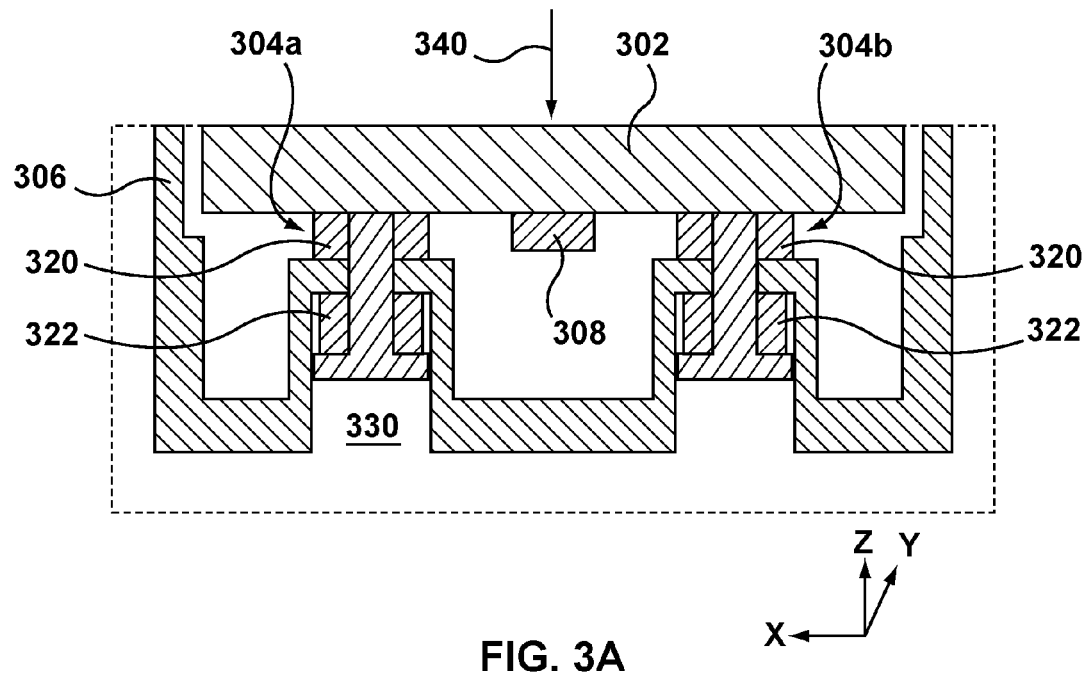
FIG. 3A illustrates a downward force along a z-axis being applied to the touch screen of the haptic device of FIG. 3.
Figure 3B:
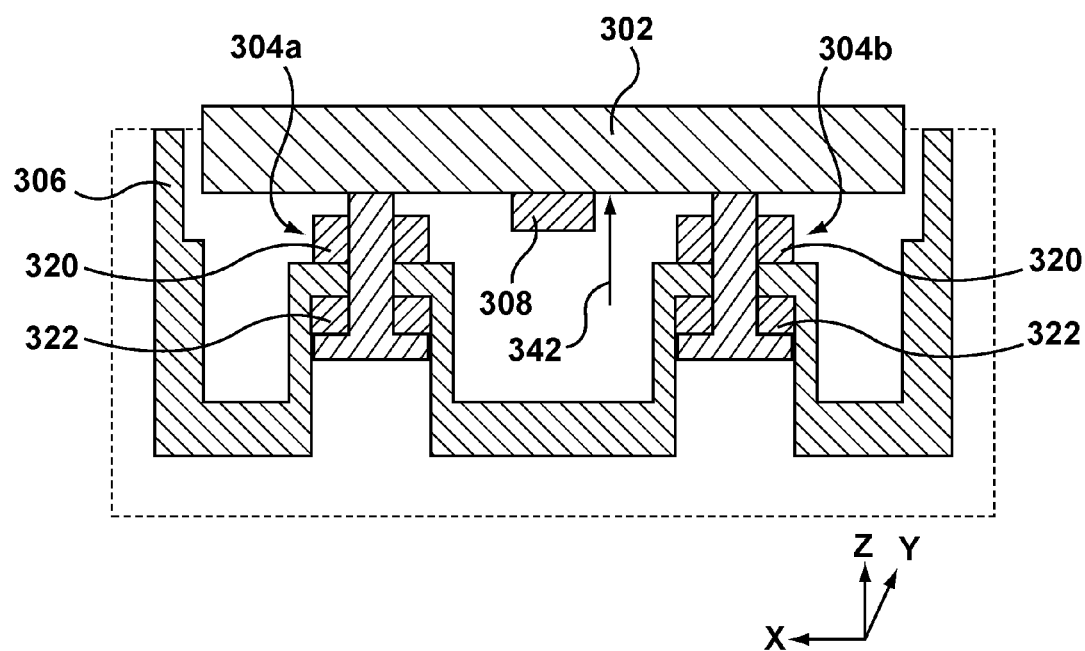
FIG. 3B illustrates an upward force along the z-axis being applied to the touch screen of the haptic device of FIG. 3.

More particularly, each dual stiffness suspension system 304A, 304B has a first element or component 320 of a first stiffness and a second element or component 322 of a second stiffness. The first stiffness of first element 320 is stiffer or greater than the second stiffness of second element 322. In one embodiment, although not required, second element 322 is readily compressible or compliant. When a user presses down on touch screen 302 during operation thereof, as illustrated in FIG. 3A including a downward directional arrow 340, stiffer first element 320 of each dual stiffness suspension system limits or restricts movement of touch screen 302 relative to housing component 306 in a first direction along a translation axis of the device, which in this example is in the z-axis, so that the user feels as though touch screen 302 is rigidly mounted within housing component 314. However, in reaction to the force produced by actuator 308, the more compliant second element 322 of each dual stiffness suspension system allows movement of touch screen 302 relative to housing component 306 in a second or opposing direction along the z-axis as illustrated in FIG. 3B including a upward directional arrow 342. Thus, dual stiffness suspension systems in accordance with embodiments hereof have different stiffnesses in opposing actuation directions in order to restrict movement or travel in a particular or first direction while still allowing for movement in a second or opposing direction. Although dual stiffness suspension systems 304A, 304B are configured to allow preferential movement along the z-axis, such dual stiffness suspension systems may be configured to allow preferential movement in other directions of actuation, such as along the x-axis or the y-axis, as will be discussed in more detail herein with respect to FIG. 10.

Figures 4, 5:
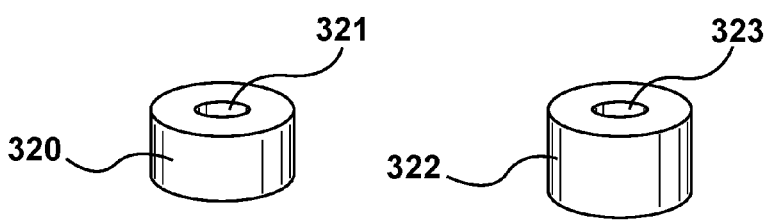
FIG. 4 is a perspective view of the first elastomeric element of the dual stiffness suspension system of the haptic device of FIG. 3, wherein the first elastomeric element is removed from the haptic device for illustrative purposes only.
FIG. 5 is a perspective view of the second elastomeric element of the dual stiffness suspension system of the haptic device of FIG. 3, wherein the second elastomeric element is removed from the haptic device for illustrative purposes only.

With reference to FIGS. 4 and 5 which illustrate perspective views of first and second elements 320, 322 of dual stiffness suspension systems 304A, 304B removed from haptic device 300, first and second elements 320, 322 are cylindrical or tubular components that each define a lumen or channel 321, 323, respectively, there-through. The cylindrical or tubular components may have flat top and bottom surfaces, or may have rounded top and bottom surfaces similar to an annular O-ring. Although shown as defining circular lumens or channels 321, 323, the first and second elements may have alternative cross-sectional shapes. For example, in another embodiment (not shown), the first and second elements may be O-rings with a star cross-sectional extruded shape, or that any cross-sectional shape that may change overall compliance. First and second elements 320, 322 have the same configuration or shape, and are both formed from an elastomeric material such as without limitation silicone rubber, natural rubber and a thermoplastic elastomer (TPE), with a Durometer hardness in the range of 10 Shore A to 95 Shore A. In one embodiment, first and second elements 320, 322 are formed from the same elastomeric material but have different Durometer hardnesses such that the first stiffness of first element 320 is stiffer or greater than the second stiffness of second element 322. In another embodiment, first and second elements 320, 322 are formed from different elastomeric materials having different Durometer hardnesses such that the first stiffness of first element 320 is stiffer or greater than the second stiffness of second element 322. For example, in one embodiment hereof, first element 320 is a Shore 50 Buna-N O-ring while second element 322 is a Shore 20 Silicone elastomer O-Ring.

In addition to allowing preferential movement of touch screen 302 with respect to housing component 306 in a first direction while limiting movement in at least a second opposing direction, the elastomeric components of dual stiffness suspension systems 304A, 304B offer the additional benefit of waterproofing without requiring an additional part or gasket. More particularly, one or more waterproofing gaskets would typically be included between touch screen 302 and housing component 306 to prevent water or other liquid external to haptic device 300 from seeping into the interior of the haptic device and potentially damaging the electronic components housed therein. Such a waterproofing gasket is typically positioned in the gap areas 344 between touch screen 302 and housing component 306. However, first components 320 which are formed from an elastomeric material serve as waterproofing gaskets and thus an additional part or component is not required, thereby reducing the total part count required for haptic device 300.

Each dual stiffness suspension system 304A, 304B is installed between touch screen 302 and housing component 306 via a support mount or holder 324. Each support mount 324 includes a cylindrical post or rod 326 and a base plate 328. A first end of post 326 is coupled to an underside surface of touch screen 302, and base plate 328 is coupled to a second end of post 326. Post 326 is sized to be positioned through lumens 321, 323 of first and second elements 320, 322, respectively, as well as through a channel or lumen 334 extending through housing component 306. An outer diameter of post 326 is equal to or only slightly less than the diameter of lumens 321, 323 of first and second elements 320, 322, respectively, as well as the diameter of lumen 334 extending through housing component 306. When assembled, first and second elements 320, 322 of dual stiffness suspension systems 304A, 304B are each positioned over post 326 of each support mount 324, with first element or component 320 of dual stiffness suspension systems 304A, 304B extending or sandwiched between touch screen 302 and a portion of housing component 306 and second element or component 322 of dual stiffness suspension systems 304A, 304B extending or sandwiched between a portion of housing component 306 and base plate 328. First and second elements 320, 322 are not required to be adhered or fixed to any other component of the haptic device, but rather are positioned or sandwiched between the touch screen and the housing component, or between the housing component and the base plate. In another embodiment hereof, one surface of each of first and second elements 320, 322 may be adhered or fixed to an adjacent component of the haptic device.

Due to post 326 extending or being positioned through channel or lumen 334 of housing component 306, side to side movement of touch screen 302 along the x-axis and along the y-axis is substantially not permitted or restricted. In addition, first elements 320 of dual stiffness suspension systems 304A, 304B are formed of a sufficiently stiff material that downward movement of touch screen 302 along the z-axis, i.e., perpendicular to haptic device 300 and touch screen 302, is also restricted. In one embodiment hereof, downward movement of touch screen 302 along the z-axis is not restricted or limited as much as movement along the x-axis and along the y-axis. Downward movement of touch screen 302 along the z-axis is only restricted or limited enough to not feel like the touch screen is moving when pressed, but such downward movement may be permitted or allowed during the vibration of the haptic effect. Thus, when the user applies forces to touch screen 302 along either the x-axis in any direction, the y-axis in any direction, and/or the z-axis in a downward direction, dual stiffness suspension systems 304A, 304B do not allow movement of touch screen 302 in these directions and as such the user feels as though touch screen 302 is rigidly mounted within main housing 314 of haptic device 300. However, when actuator 308 outputs a force along the z-axis, second elements 322 of dual stiffness suspension systems 304A, 304B are formed of a sufficiently compliant material that upward movement of touch screen 302 along the z-axis, and in some embodiments downward movement of touch screen 302 along the z-axis as well, is permitted in order to provide haptic effects to the user. Thus, second elements 322 of dual stiffness suspension systems 304A, 304B allow a user to feel vibrations, jolts, and similar tactile feedback produced by actuator 308 while first elements 320 of dual stiffness suspension systems 304A, 304B provide stability to touch screen 302 during user operation thereof.

In addition to restricting movement of touch screen 302 along the x- and y-axes as described above, the geometry or configuration of carrier or housing component 306 also limits excessive movement or travel along the z-axis in an upward direction in the embodiment of FIG. 3. More particularly, as described above, second elements 322 of dual stiffness suspension systems 304A, 304B are formed of a sufficiently compliant material such that upward movement of touch screen 302 along the z-axis is permitted in order to provide haptic effects to the user when actuator 308 outputs a force along the z-axis. However, it may be desirable to limit or restrict excessive upward movement of touch screen 302 along the z-axis. In the embodiment of FIG. 3, carrier or housing component 306 is shaped or configured so that second elements 322 of dual stiffness suspension systems 304A, 304B are housed within wells or bores 330 defined by sidewall extensions 332 of housing component 306. Essentially, with reference to FIG. 3B which shows upward movement of touch screen 302 being allowed via the force applied by actuator 308 along the z-axis in an upward direction as indicated by directional arrow 342, second elastomeric element 322 radially expands when it is compressed or squished as a result of the upward movement of touch screen 302. Sidewall extensions 332 of housing component 306 radially surround each of the second elastomeric elements and thereby limit the amount of axial compression and radial expansion thereof when actuator 308 outputs a force along the z-axis. When each of the second elastomeric elements 332 are compressed within wells or bores 330, the stiffer material of sidewall extensions 332 of housing component 306 will restrict or prevent excessive compression of the second elastomeric elements 332 in the radial direction, thereby limiting excessive movement or travel by touch screen 302 in upward direction of the z-axis. Stated another way, sidewall extensions 332 of housing component 306 act as a hard stop, i.e., a physical retainer, to touch screen 302 should the moving structure of haptic device 300 ever cause the second elastomeric elements 332 to reach a maximum deflection along the z-axis in an upward direction. The amount or degree of the limitation on excessive movement or travel may be selected by varying the distance or space allowed between the second elastomeric elements and sidewall extensions 332.

Figure 6:
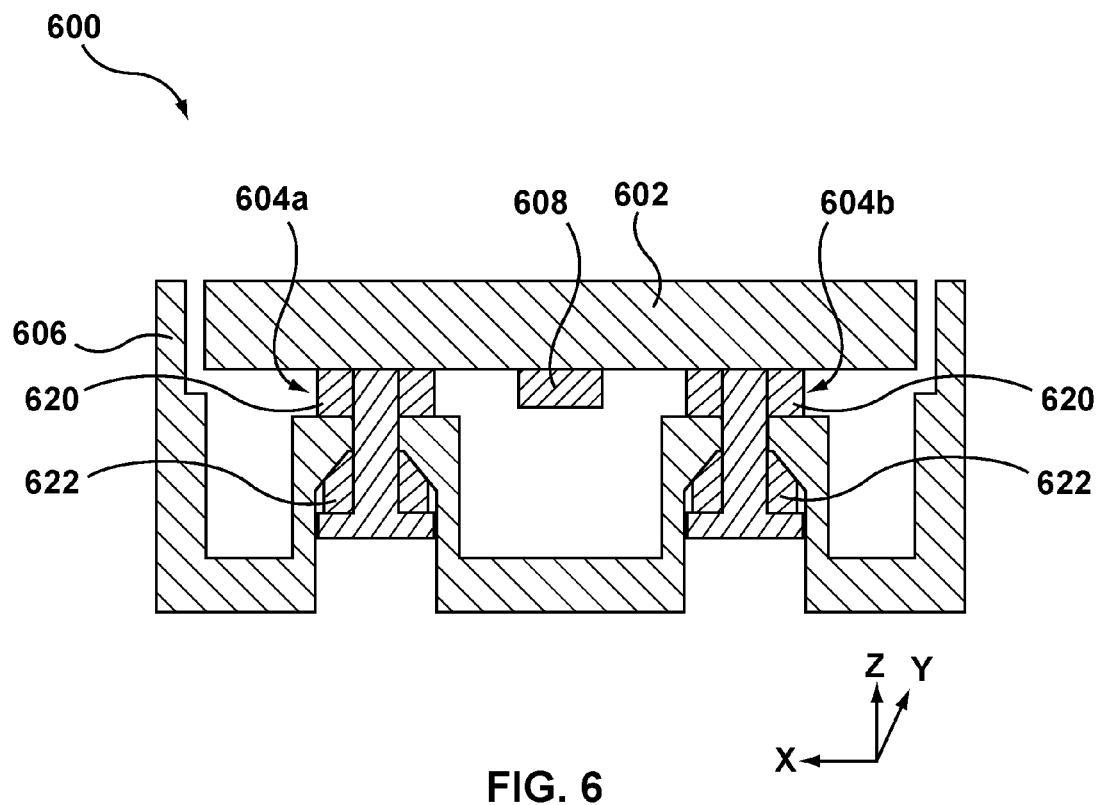
FIG. 6 is a side sectional view of a haptic device for providing haptic feedback according to another embodiment hereof, wherein a dual stiffness suspension system is utilized for suspension and the dual stiffness suspension system includes a first elastomeric element or component having an alternative shape or configuration from a second elastomeric element or component.

As stated above, the first and second elements of the dual stiffness suspension system may be formed out of elastomeric materials having different Durometer hardnesses such that the first stiffness of the first element is stiffer or greater than the second stiffness of the second element. However, in another embodiment hereof, the first and second elastomeric elements of the dual stiffness suspension system may have different shapes or configurations such that the first stiffness of the first element is stiffer or greater than the second stiffness of the second element. Stated another way, varying the geometry or shape of one of the elements of the dual stiffness suspension systems may change the stiffness of that element along a particular axis. More particularly, FIG. 6 illustrates a haptic device 600 that includes a touch surface or screen 602, a carrier or housing component 606, a haptic actuator 608 for providing a haptic effect to a user of the touch screen, and dual stiffness suspension systems 604A, 604B that couple touch screen 602 and housing component 606 together such that the touch screen is movable relative to the housing component. Although not shown, it will be understood by one of ordinary skill in the art that carrier or housing component 606 is rigidly or fixedly coupled to a main housing (not shown) as shown and described in the embodiment of FIG. 3.

Dual stiffness suspension systems 604A, 604B operate similar to dual stiffness suspension systems 304A, 304B described above except that at least portions of components thereof have different shapes or configurations in order to provide haptic device 600 with two elements or components of different stiffnesses in opposing actuation directions in order to restrict movement or travel of touch screen 602 with respect to housing component 606 in a particular or first direction while still allowing for movement in a second or opposing direction. More particularly, each dual stiffness suspension system 604A, 604B has a first element or component 620 of a first stiffness and a second element or component 622 of a second stiffness. The first stiffness of first element 620 is stiffer or greater than the second stiffness of second element 622, which is readily compressible or compliant. When a user presses down on touch screen 602 during operation thereof, stiffer first element 620 of each dual stiffness suspension system limits or restricts movement of touch screen 602 relative to housing component 606 in a first direction along a translation axis of the device, which in this example is in the z-axis, so that the user feels as though touch screen 602 is rigidly mounted within the main housing component. However, in reaction to the force produced by actuator 608, the more compliant second element 622 of each dual stiffness suspension system allows movement of touch screen 602 relative to housing component 606 in a second or opposing direction along the z-axis.

Figures 7, 8:
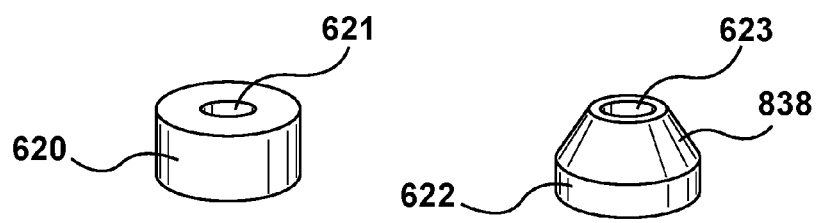
FIG. 7 is a perspective view of the first elastomeric element of the dual stiffness suspension system of the haptic device of FIG. 6, wherein the first elastomeric element is removed from the haptic device for illustrative purposes only.
FIG. 8 is a perspective view of the second elastomeric element of the dual stiffness suspension system of the haptic device of FIG. 6, wherein the second elastomeric element is removed from the haptic device for illustrative purposes only.

FIGS. 7 and 8 illustrate perspective views of first and second elements 620, 622 of dual stiffness suspension systems 604A, 604B removed from haptic device 600. Unlike the previous embodiment of FIG. 3, first and second elements 620, 622 have different shapes and configurations in order to vary the stiffnesses thereof. First element 620 is similar to first element 320 and is a cylindrical or tubular component that defines a lumen or channel 621 therethrough. Second element 622 also defines a lumen or channel 623 there-through but second element 622 includes a frusto-conical portion 838 which alters the stiffness thereof such that second element 622 is less stiff than first element 620. First and second elements 620, 622 are both formed from an elastomeric material such as without limitation silicone rubber, natural rubber and a thermoplastic elastomer (TPE), with hardness in the range of 10 Shore A to 95 Shore A. In this embodiment, since the different stiffnesses of the first and second elements result from the different shapes or configurations thereof, first and second elements 620, 622 may be formed from the same elastomeric material having the same Durometer hardnesses. Alternatively, first and second elements 620, 622 may be formed from different elastomeric materials. In addition, portion 838 of second element 622 may have a shape or configuration other than frusto-conical in order to alter the stiffness thereof. For example, portion 838 of second element 622 may be elliptical, bowl shaped, pyramid shaped, or any other configuration having a decreased surface area taken along a horizontal line there-through.

Figure 9:
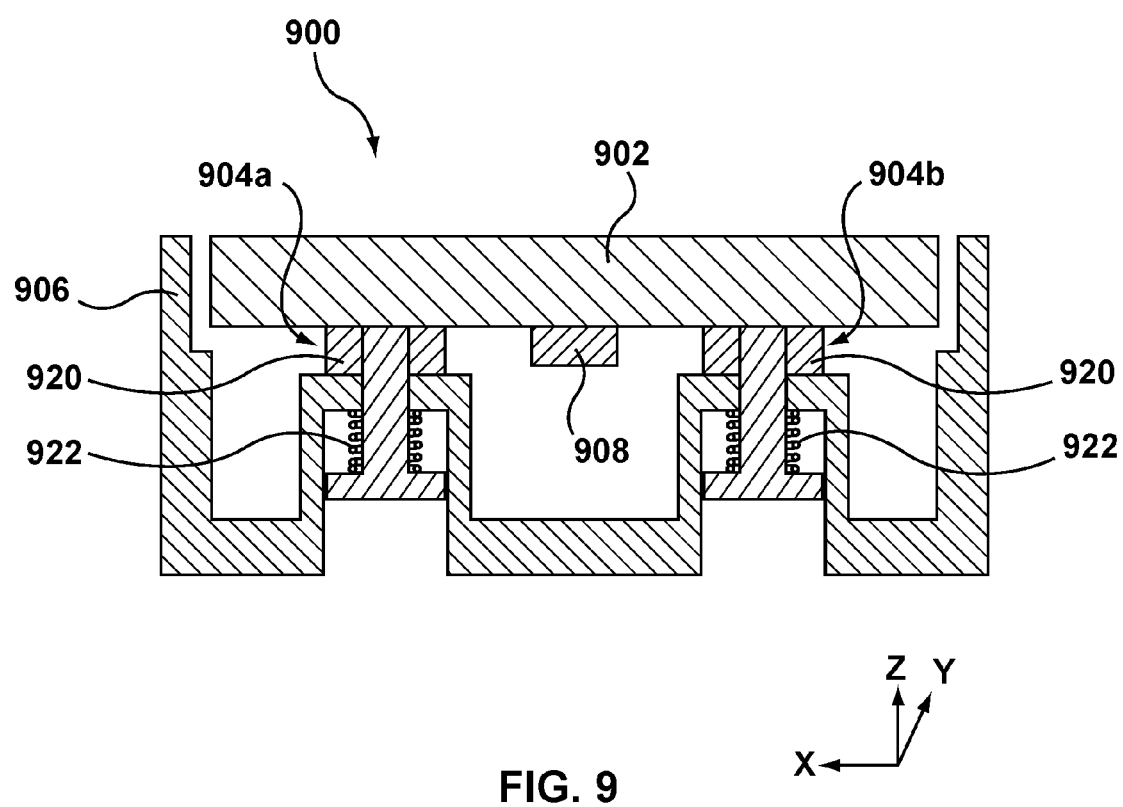
FIG. 9 is a side sectional view of a haptic device for providing haptic feedback according to another embodiment hereof, wherein a dual stiffness suspension system is utilized for suspension and the dual stiffness suspension system includes a first elastomeric element or component and a second non-elastomeric spring element or component.

In another embodiment, one or both of the first and second elements of the dual stiffness suspension system may be a non-elastomeric spring component in order to configure the first stiffness of the first element to be stiffer or greater than the second stiffness of the second element. More particularly, FIG. 9 illustrates a haptic device 900 that includes a touch surface or screen 902, a carrier or housing component 906, a haptic actuator 908 for providing a haptic effect to a user of the touch screen, and dual stiffness suspension systems 904A, 904B that couple touch screen 902 and housing component 906 together such that the touch screen is movable relative to the housing component. Although not shown, it will be understood by one of ordinary skill in the art that carrier or housing component 906 is rigidly or fixedly coupled to a main housing (not shown) as shown and described in the embodiment of FIG. 3.

Dual stiffness suspension systems 904A, 904B operate similar to dual stiffness suspension systems 304A, 304B described above except that at least one of the elements is a non-elastomeric spring component to provide haptic device 900 with two elements or components of different stiffnesses in opposing actuation directions in order to restrict movement or travel of touch screen 902 with respect to housing component 906 in a particular or first direction while still allowing for movement in a second or opposing direction. More particularly, each dual stiffness suspension system 904A, 904B has a first elastomeric element or component 920 of a first stiffness and a second non-elastomeric spring element or component 922 of a second stiffness. The first stiffness of first element 920 is stiffer or greater than the second stiffness of second element 922, which is readily compressible or compliant. When a user presses down on touch screen 902 during operation thereof, stiffer first element 920 of each dual stiffness suspension system limits or restricts movement of touch screen 902 relative to housing component 906 in a first direction along a translation axis of the device, which in this example is in the z-axis, so that the user feels as though touch screen 902 is rigidly mounted within the main housing component. However, in reaction to the force produced by actuator 908, the more compliant second element 922 of each dual stiffness suspension system allows movement of touch screen 902 relative to housing component 906 in a second or opposing direction along the z-axis.

First elastomeric element 920 is similar to first element 320 and is a cylindrical or tubular component that defines a lumen or channel (not shown in FIG. 9) there-through. In the embodiment of FIG. 9, second element 922 is a helical or coiled spring element that also defines a lumen or channel (not shown in FIG. 9) there-through. The helical or coiled spring element of second element 922 is less stiff, or more compliant, than first elastomeric element 920. As will be understood by those of ordinary skill in the art, other non-elastomeric spring elements other than a helical or coiled element may be utilized as second element 922. For example, second non-elastomeric spring element 922 may be a flexure or leaf spring that is less stiff, or more compliant, than first elastomeric element 920. In addition, in another embodiment hereof (not shown), the first element of the dual stiffness suspension system may be replaced with a different spring element, i.e., a helical or coiled spring element or a leaf spring element, which is more stiff than the second element of the dual stiffness suspension system, which may be a compliant elastomer, a helical or coiled spring element, or a leaf spring element. Essentially, one or both elements of the dual stiffness suspension system may be any type of spring element including but not limited to elastomers, helical or coiled springs, leaf-springs, flat springs, wave washers, snap dome springs, as long as the two elements or components have different stiffnesses in opposing actuation directions in order to restrict movement or travel of the touch screen with respect to the housing component in a particular or first direction while still allowing for movement in a second or opposing direction.

Figure 10:
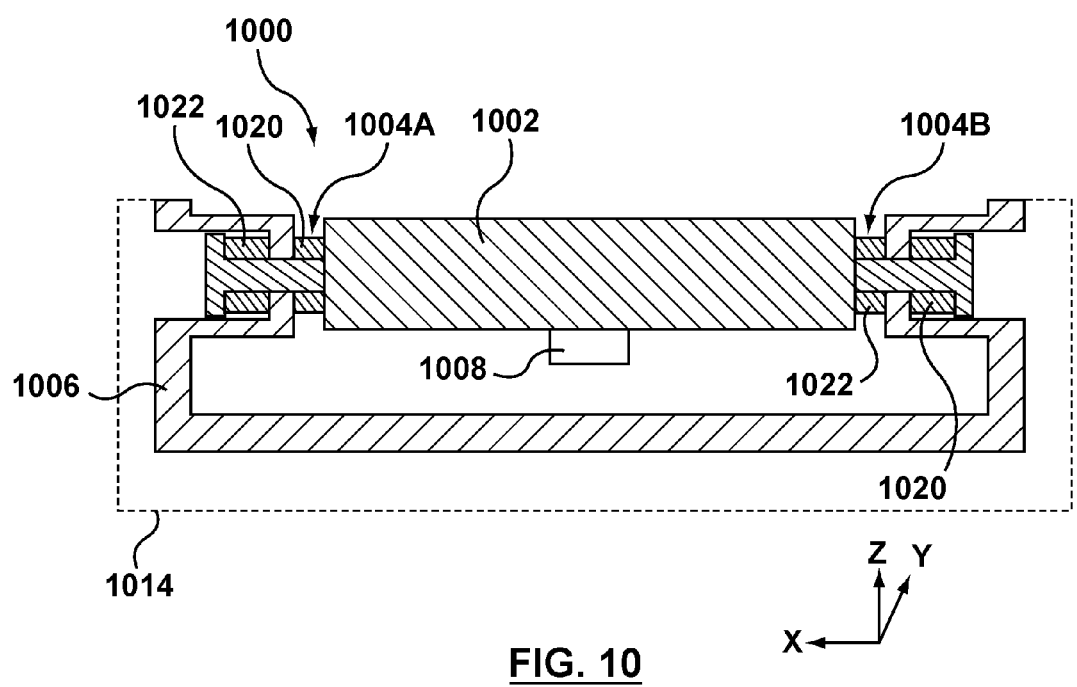
FIG. 10 is a side sectional view of a haptic device for providing haptic feedback according to another embodiment hereof, wherein a dual stiffness suspension system is utilized for suspension along an x-axis.

In addition to varying the type of spring element utilized in the dual stiffness suspension system, a dual stiffness suspension system may be configured to allow preferential movement in directions of actuation other than along the z-axis. More particularly, FIG. 10 illustrates a haptic device 1000 that includes a touch surface or screen 1002, a carrier or housing component 1006, a haptic actuator 1008 for providing a haptic effect to a user of the touch screen, and dual stiffness suspension systems 1004A, 1004B that couple touch screen 1002 and housing component 1006 together such that the touch screen is movable relative to the housing component. Although not shown, it will be understood by one of ordinary skill in the art that carrier or housing component 1006 is rigidly or fixedly coupled to a main housing 1014 shown in phantom in FIG. 10. In this embodiment, the forces produced or output by actuator 1008 onto touch screen 1002 are linear and along the x-axis, parallel to the planar surface of the touch screen 1002.

First and second elements 1020, 1022 of dual stiffness suspension systems 1004A, 1004B are similar to first and second elements 320, 322 of dual stiffness suspension systems 304A, 304B except that the suspensions systems are oriented to restrict movement or travel of touch screen 1002 with respect to housing component 1006 in a particular or first direction along the x-axis while still allowing for movement in a second or opposing direction along the x-axis. More particularly, each dual stiffness suspension system 1004A, 1004B has a first element or component 1020 of a first stiffness and a second element or component 1022 of a second stiffness. The first stiffness of first element 1020 is stiffer or greater than the second stiffness of second element 1022, which is readily compressible or compliant. Notably, when oriented as a suspension system along the x-axis rather than the z-axis, the positions of first and second elements of dual stiffness suspension systems 1004A, 1004B are switched with respect to each other. More particularly, stiffer first element 1020 of dual stiffness suspension system 1004A extends between touch screen 1002 and housing component 1006 while stiffer first element 1020 of dual stiffness suspension system 1004B extends between housing component 1006 and the base plate of its support mount. Similarly, less stiff second element 1022 of dual stiffness suspension system 1004A extends between housing component 1006 and the base plate of its support mount while less stiff second element 1022 of dual stiffness suspension system 1004B extends between touch screen 1002 and housing component 1006. Thus, if the system orientation is left to right, the right elements of each suspension element are the same and the left elements of each suspension element are the same. As such, when a user applies a side-to-side force along the x-axis onto touch screen 1002 during operation thereof, such as by applying a sliding movement onto touch screen 1002, stiffer first elements 1020 of dual stiffness suspension systems 1004A, 1004B work in cooperation to limit or restrict movement of touch screen 1002 relative to housing component 1006 in a first direction along a translation axis of the device, which in this example is in the x-axis. However, in reaction to the force produced by actuator 1008 along the x-axis, the more compliant second elements 1022 of dual stiffness suspension systems 1004A, 1004B work in cooperation allow movement of touch screen 1002 relative to housing component 1006 in a second or opposing direction along the x-axis. Although not shown herein, dual stiffness suspension systems may be configured to allow preferential movement along the y-axis as well.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention.

Figure 11:
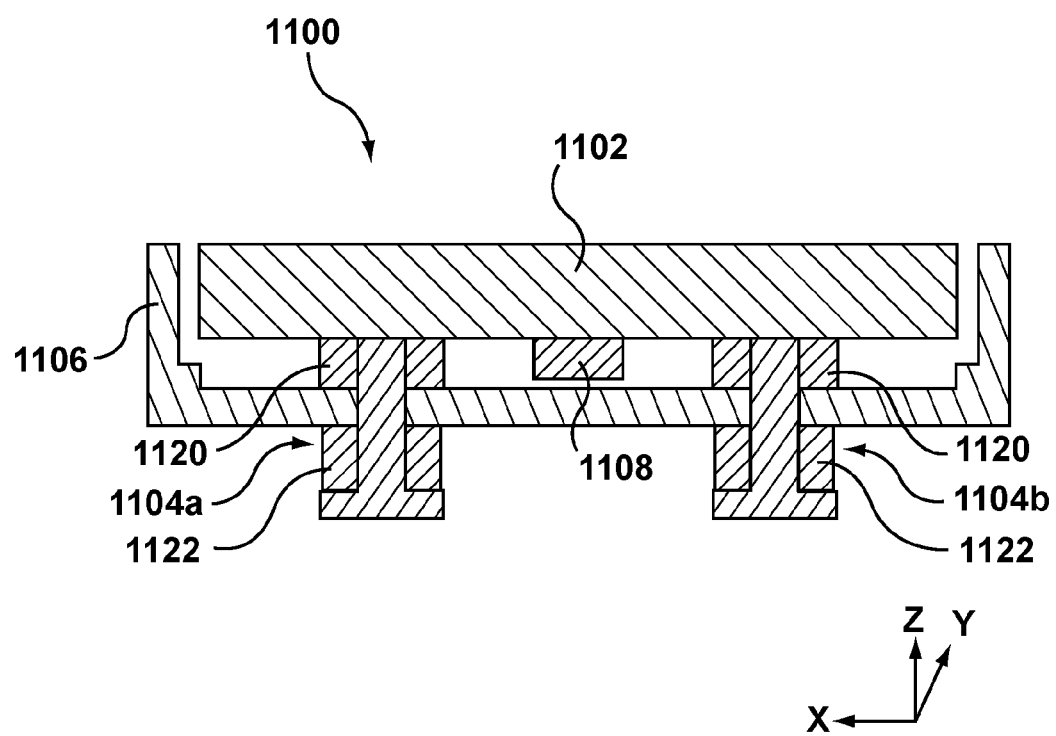
FIG. 11 is a side sectional view of a haptic device for providing haptic feedback according to another embodiment hereof, wherein a dual stiffness suspension system is utilized for suspension and the dual stiffness suspension system includes a first elastomeric element or component and a second elastomeric element or component, wherein a carrier of the haptic device in this embodiment does not include wells or bores.

For example, the housing component or carrier is not required to be shaped or configured such that an element of the dual stiffness suspension system is housed within wells or bores defined by sidewall extensions thereof. Such wells or bores which limit or restrict excessive movement of the suspension system are not required, such as shown in the embodiment of FIG. 11 that includes a haptic device 1100 that includes a touch surface or screen 1102, a carrier or housing component 1106, a haptic actuator 1108 for providing a haptic effect to a user of the touch screen, and dual stiffness suspension systems 1104A, 1104B that couple touch screen 1102 and housing component 1106 together such that the touch screen is movable relative to the housing component. First and second elements 1120, 1122 of dual stiffness suspension systems 1104A, 1104B are identical to first and second elements 320, 322 of dual stiffness suspension systems 304A, 304B. Further, haptic device 1100 is identical to haptic device 300 except that carrier or housing component 1106 does not include sidewall extensions that define wells or bores for housing the second or more compliant elements 1122 of dual stiffness suspension systems 1104A, 1104B.

Figure 12:
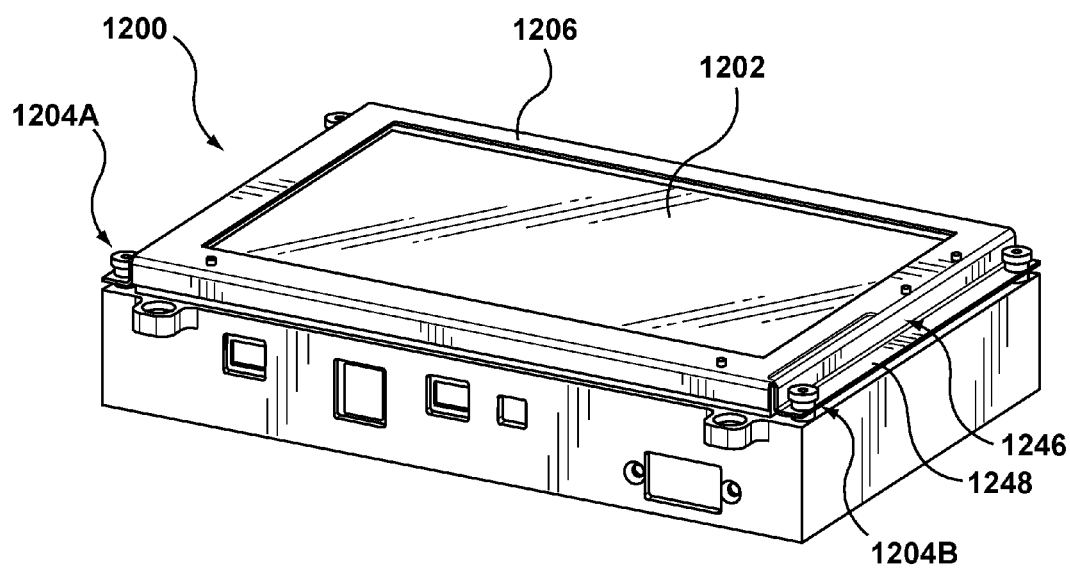
FIGS. 12 and 13 are perspective and side sectional views, respectively, of a haptic device for providing haptic feedback according to another embodiment hereof, wherein a dual stiffness suspension system is utilized for suspension and the dual stiffness suspension system includes a first elastomeric element or component and a second elastomeric element or component, wherein a portion of a carrier of the haptic device in this embodiment is sandwiched by the first and second elastomeric components.
Figure 13:
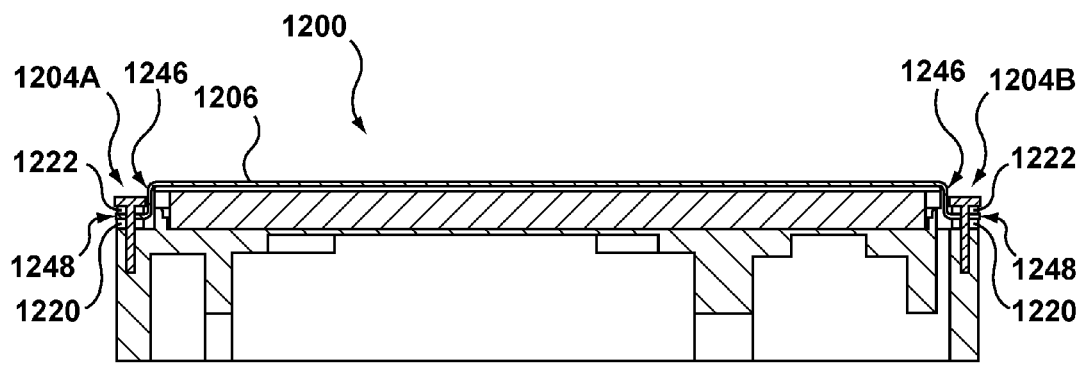

In addition, dual stiffness suspension systems according to embodiments shown herein may be coupled to the main housing in other ways than shown above. For example, FIGS. 12 and 13 illustrate a haptic device 1200 that includes a touch surface or screen 1202, a carrier or housing component 1206, and dual stiffness suspension systems 1204A, 1204B that couple touch screen 1202 and housing component 1206 together such that the touch screen is movable relative to the housing component. First and second elements 1220, 1222 of dual stiffness suspension systems 1204A, 1204B are identical to first and second elements 320, 322 of dual stiffness suspension systems 304A, 304B. Further, haptic device 1200 is similar to haptic device 300 except that carrier or housing component 1206 has a different shape or configuration and haptic device 1200 does not includes a support mount having a post and base plate for coupling the dual stiffness suspension systems to the touch screen as described above with respect to FIG. 3. More particularly, housing component 1206 includes L-shaped brackets 1246 coupled to or formed integrally with the housing component on opposing edges thereof. First and second elements 1220, 1222 of dual stiffness suspension systems 1204A, 1204B sandwich planar portions 1248 of L-shaped brackets 1246. Stated another way, first stiffer elements 1220 are disposed below or under planar portions 1248 of L-shaped brackets 1246 and second compliant elements 1222 are disposed above or on top of planar portions 1248 of L-shaped brackets 1246.

Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A device having a dual stiffness suspension system comprising:

a housing component;
a touch element;
a haptic actuator for moving the touch element relative to the housing component and thereby provide a haptic effect to a user of the touch element; and
at least one dual stiffness suspension system that couples the touch element and the housing component together such that the touch element is movable relative to the housing component, the at least one dual stiffness suspension system having a first element of a first stiffness and a second element of a second stiffness, the first stiffness being stiffer than the second stiffness, wherein the at least one dual stiffness suspension system is configured to limit movement between the touch element and the housing component in at least a first direction due to the first element of the dual stiffness suspension system while also being configured to allow movement of the touch element relative to the housing component in a second direction opposing the first direction due to the second element of the dual stiffness suspension system, and wherein the first element is disposed adjacent to and contacts a first surface of a portion of the housing component and the second element is disposed adjacent to and contacts a second opposing surface of the portion of the housing component such that the first and second elements are axially aligned with each other.

2. The device of claim 1, wherein the touch element is a touch pad.

3. The device of claim 2, wherein the first element is formed from a first elastomeric material and the second element is formed from a second elastomeric material, the first elastomeric material being different from the second elastomeric material.

4. The device of claim 2, wherein the first element is formed from a first elastomeric material and the second element is formed from a second elastomeric material, the first elastomeric material being the same as the second elastomeric material.

5. The device of claim 4, wherein the first elastomeric material has a different durometer hardness than the second elastomeric material.

6. The device of claim 4, wherein the first element has a first shape and the second element has a second shape, the first shape being different from the second shape.

7. The device of claim 6, wherein the first shape is cylindrical and the second shape includes a frustoconical portion.

8. The device of claim 1, wherein the housing component includes sidewall extensions that define a well for receiving the second element of the dual stiffness suspension system, wherein the sidewall extensions limit excessive movement between the touch element and the housing component in the second direction.

9. The device of claim 1, wherein the first element is formed from a first elastomeric material and the second element is one of a coil or a leaf spring.

10. The device of claim 1, wherein the at least one dual stiffness suspension system includes a support mount having a post and a base plate, with a first end of the post being coupled to an underside surface of the touch element and a second end of the post being coupled to the base plate, and wherein the post of the support mount extends through a channel formed through the portion of the housing component as well as through the first and second elements of the at least one dual stiffness suspension system such that the first element is sandwiched between the touch element and the portion of the housing component and the second element is sandwiched between the portion of housing component and the base plate.

11. The device of claim 1, wherein the portion of the housing component is a planar portion of an L-shaped bracket coupled to an outer edge of the housing component.

12. A device having a dual stiffness suspension system comprising:
 a housing component;
 a touch element;
 a haptic actuator for moving the touch element relative to the housing component and thereby provide a haptic effect to a user of the touch element; and
 at least one dual stiffness suspension system that couples the touch element and the housing component together such that the touch element is movable relative to the housing component, the at least one dual stiffness suspension system having a first element formed from a first elastomeric material having a first stiffness and a second element formed from a second elastomeric material having a second stiffness, the first stiffness being stiffer than the second stiffness, wherein the first element of the dual stiffness suspension system is configured to limit movement between the touch element and the housing component in at least a first direction while the second element of the dual stiffness suspension system is configured to allow movement of the touch element relative to the housing component in a second direction opposing the first direction, and wherein the first element is disposed adjacent to and contacts a first surface of a portion of the housing component and the second element is disposed adjacent to and contacts a second opposing surface of the portion of the housing component such that the first and second elements are axially aligned with each other.

13. The device of claim 12, wherein the touch element is a touch pad.

14. The device of claim 13, wherein the first element is formed from the first elastomeric material and the second element is formed from the second elastomeric material, the first elastomeric material being different from the second elastomeric material.

15. The device of claim 13, wherein the first element is formed from the first elastomeric material and the second element is formed from the second elastomeric material, the first elastomeric material being the same as the second elastomeric material.

16. The device of claim 15, wherein the first element has a first shape and the second element has a second shape, the first shape being different from the second shape.

17. A device having a dual stiffness suspension system comprising:
 a housing component;
 a touch element;
 a haptic actuator for moving the touch element relative to the housing component and thereby provide a haptic effect along a first axis of the device to a user of the touch element; and
 at least one dual stiffness suspension system that couples the touch element and the housing components together such that the touch element is movable relative to the housing component, the at least one dual stiffness suspension system having a first element of a first stiffness and a second element of a second stiffness, the first stiffness being stiffer than the second stiffness, wherein the at least one dual stiffness suspension system is configured to limit movement between the touch element and the housing component in at least a first direction due to the first element of the dual stiffness suspension system while also being configured to allow movement of the touch element relative to the housing component in a second direction due to the second element of the dual stiffness suspension system, wherein the first direction and the second direction oppose each other and extend along the first axis of the device, wherein the at least one dual stiffness suspension system includes a support mount having a post and a base plate, with a first end of the post being coupled to an underside surface of the touch element and a second end of the post being coupled to the base plate, and wherein the post of the support mount extends through a channel formed through a portion of the housing component as well as through the first and second elements of the at least one dual stiffness suspension system such that the first element is sandwiched between the touch element and the portion of the housing component and the second element is sandwiched between the portion of housing component and the base plate, the channel being sized to limit movement between the touch element and the housing component along at least a second axis of the device.

18. The device of claim 17, wherein the touch element is a touch pad.

19. The device of claim 18, wherein the first element is formed from a first elastomeric material and the second element is formed from a second elastomeric material.

20. The device of claim 18, wherein the first element is formed from a first elastomeric material and the second element is one of a coil or a leaf spring.

* * * * *

UNITED STATES PATENT AND TRADEMARK OFFICE
CERTIFICATE OF CORRECTION

PATENT NO. : 9,501,172 B2  
APPLICATION NO. : 14/968102  
DATED : November 22, 2016  
INVENTOR(S) : Redelsheimer et al.

It is certified that error appears in the above-identified patent and that said Letters Patent is hereby corrected as shown below:

In the Claims

Column 15, Lines 2-3 (Claim 10): "housing component" should be replaced with --the housing component--.

Column 16, Line 38 (Claim 17): "housing component" should be replaced with --the housing component--.

Signed and Sealed this
Twenty-first Day of March, 2017

Michelle K. Lee
*Director of the United States Patent and Trademark Office*